(12) United States Patent
Kwa

(10) Patent No.: US 10,796,666 B2
(45) Date of Patent: *Oct. 6, 2020

(54) DISPLAY INTERFACE PARTITIONING

(71) Applicant: INTEL CORPORATION, Santa Clara, CA (US)

(72) Inventor: Seh W. Kwa, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,329

(22) Filed: Sep. 4, 2019

(65) Prior Publication Data

US 2019/0392784 A1  Dec. 26, 2019

Related U.S. Application Data

(63) Continuation of application No. 16/145,975, filed on Sep. 28, 2018, now Pat. No. 10,438,566, which is a continuation of application No. 14/129,533, filed as application No. PCT/US2013/062393 on Sep. 27, 2013, now Pat. No. 10,089,962.

(51) Int. Cl.
| | | |
|---|---|---|
| *G09G 5/18* | (2006.01) | |
| *G09G 5/10* | (2006.01) | |
| *G06F 3/14* | (2006.01) | |
| *G09G 5/14* | (2006.01) | |
| *G09G 5/00* | (2006.01) | |
| *G09G 5/12* | (2006.01) | |
| *H04N 21/426* | (2011.01) | |

(52) U.S. Cl.
CPC ............. *G09G 5/18* (2013.01); *G06F 3/1423* (2013.01); *G09G 5/006* (2013.01); *G09G 5/12* (2013.01); *G09G 5/14* (2013.01); *G06F 3/14* (2013.01); *H04N 21/4263* (2013.01)

(58) Field of Classification Search
CPC combination set(s) only.
See application file for complete search history.

(56) References Cited

U.S. PATENT DOCUMENTS

2011/0310070 A1* 12/2011 Zeng .................... G06F 3/1423
345/204
2014/0204005 A1* 7/2014 Wyatt .................. G09G 3/3611
345/87

\* cited by examiner

*Primary Examiner* — Deeprose Subedi

(57) ABSTRACT

Various embodiments are generally directed to techniques to partition a display interface such that pixel data associated with display data having indications of an image to be displayed may be transmitted to multiple timing controller and driver (TCON-DR) sets over the display interface without necessitating each TCON-DR set receive all the pixel data. In some examples, the display interface may be partitioned such that each TCON-DR set receives only the pixel data for which the respective TCON-DR set corresponds to.

25 Claims, 8 Drawing Sheets

DISPLAY INTERFACE PARTITIONING

CROSS-REFERENCE TO RELATED APPLICATIONS

This application is a continuation of, claims the benefit of and priority to previously filed U.S. patent application Ser. No. 16/145,975 filed Sep. 28, 2018, entitled "DISPLAY INTERFACE PARTITIONING", which is a continuation of, claims the benefit of and priority to previously filed U.S. patent application Ser. No. 14/129,533 filed Dec. 26, 2013, which is a national phase entry of, claims the benefit of and priority to previously filed International Patent Application No. PCT/US13/62393 filed Sep. 27, 2013, entitled "DISPLAY INTERFACE PARTITIONING", which are hereby incorporated by reference in their entireties.

TECHNICAL FIELD

Embodiments described herein generally relate to partitioning a display interface for use with multiple timing controllers.

BACKGROUND

In some modern displays, the integrated circuit components that function to control the display may be bonded directly to the display glass. This is referred to as Chip-on-Glass (COG) technology or COG manufacturing. In general, a modern display includes a timing controller and one or more drivers. Accordingly, in a COG display, these components are bonded to the display glass. Said differently, the integrated circuit components that embody the timing controller and driver are connected and bonded directly to the display glass. As such, a reduction in manufacturing steps, costs, materials, and other known advantages may be realized. The timing controller and driver provide for connection to a display interface with which display data can be transmitted to the display. In some applications (e.g., high resolution, or the like), a timing controller and multiple driver components are provided, where each of the driver components are configured to control a portion of the display. For example, a display may be split into left and right halves with a first driver configured to control the left half of the display and a second driver configured to control the right half of the display.

Conventionally, the display interface is routed to the timing controller, which then provides display data to the drivers, within a single display. Accordingly, each driver receives display data for the entire display, even portions of the display for which the particular driver is not responsible. Then, each driver may individually decode the display data from the display interface for the rows and columns for which the driver is responsible for displaying. Said differently, using the example provided above, the first display driver may decode the display data from the display interface for the left half of the display and discard or ignore the display data for the right half of the display while the second display driver may decode the display data from the display interface for the right half of the display and discard or ignore the display data for the left half of the display. As such, increased amounts of power and display interface bandwidth are consumed by the need to transmit the display data for the entire display to all sets of drivers.

Furthermore, multiple displays may be connected to a single computing device. As described above, each display may include a timing controller and multiple drivers. However, multiple display interfaces would be required to provide display data to both these displays. For example, a first display interface for the first display and a second display interface for the second display. As such, computing devices with a single display interface may be unable to be connected to multiple displays.

DETAILED DESCRIPTION

Figure 1:
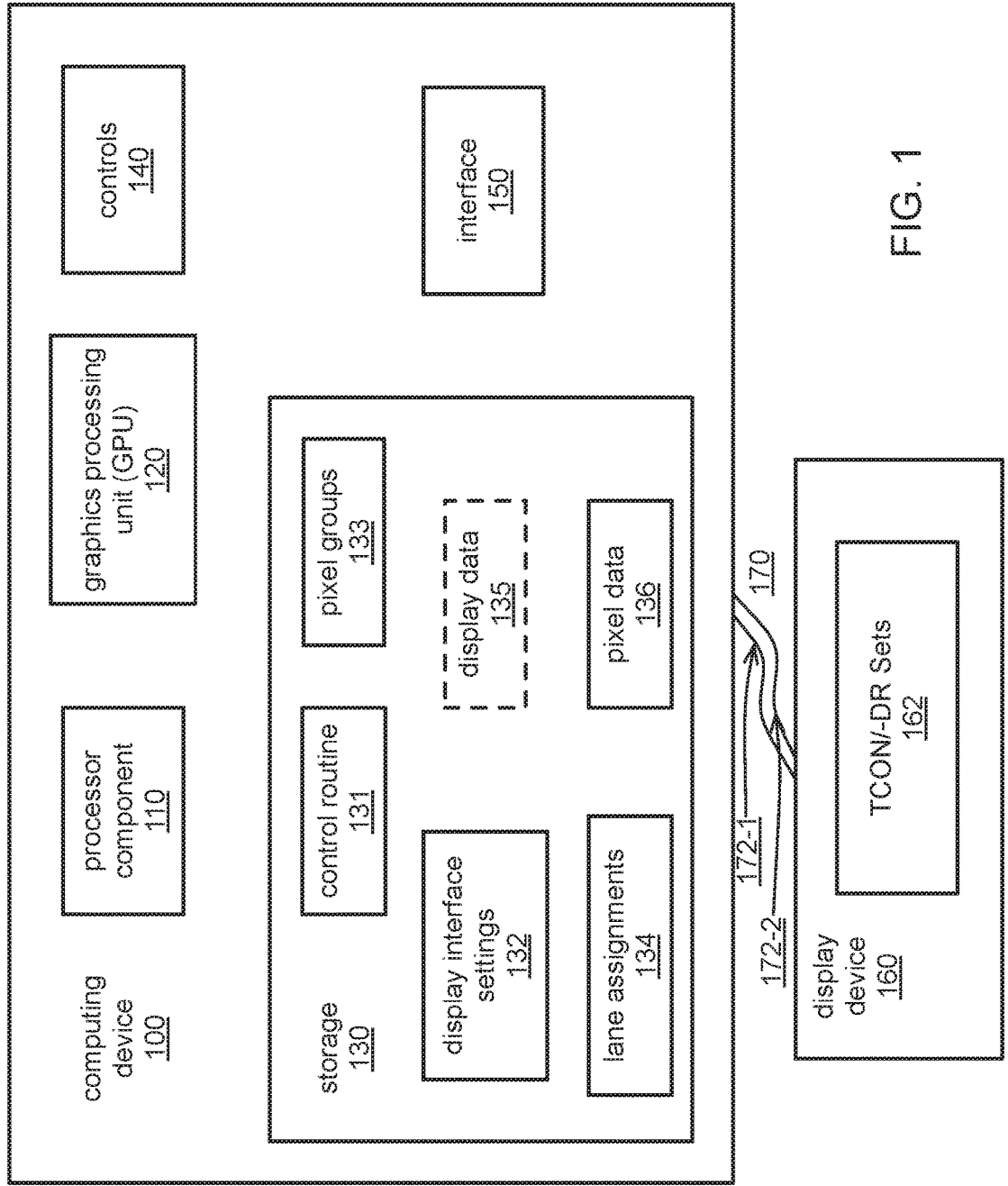
FIGS. 1-2 each illustrates an embodiment of a display interface partitioning system.

Various embodiments are generally directed to techniques to communicate display data to one or more display devices through a display interface. Display interfaces (e.g., display port, HDMI, DVI, Thunderbolt®, or the like) provide for the communication of display data between a computing device and a display device. Said differently, a computing device may transmit display data to a display device using a display interface. Display data includes indications of an image to be displayed. Said differently, display data includes information (e.g., RGB color data, or the like) corresponding to pixels of the display, which when communicated over the display interface allows the display device to display an image (e.g., on a screen, by projection, or the like). Various display interfaces exists and the present disclosure is not intended to be limited to a particular display interface. Furthermore, the number of pixels and the displayable colors for each pixel varies for different displays. The number of pixels, the displayable colors, the display type, and other characteristics that may be referenced herein, are referenced to facilitate understanding and is not intended to be limiting.

In some examples, a display device may include a number of timing controller and drivers (referred to herein as "TCON-DR") sets configured to receive display data and cause the display device to display an image based on the display data. Said differently, the TCON-DR sets receive the display data, decode the display data and cause the display device (e.g., by illuminating pixels, projecting colors, or the like) to display an image corresponding to the display data. The TCON-DR sets may be configured to control or may be operative on the pixels within different portions of the display device. For example, a display device may have two TCON-DR sets, with the first set configured to control the pixels in a first portion (e.g., left half, top half, or the like) of the display device while the second set is configured to control the pixels in a second portion (e.g., right half, lower half, or the like) of the display device.

In some examples, multiple displays may receive display data from a single computing device through a display interface. For example, a computing device may be provided with multiple displays. As another example, a computing device may be connected to multiple external displays. Each of the multiple displays may have one or more TCON-DR sets.

The present disclosure provides various examples of partitioning a display interface such that display data (e.g., pixel color information, or the like) may be communicated to multiple TCON-DR sets over the display interface. In general, partitioning the display interface according to some examples of the present disclosure includes forming groups of pixels, where each of the groups includes pixels of the display corresponding to a particular TCON-DR set. Said differently, each of the groups includes pixels of the display for which a particular TCON-DR set is operative on.

One or more display interface lanes then may be assigned to each of the groups. Said differently, at least one of the display interface lanes may be assigned to each of the groups. Display data may be communicated to the display device by transmitting the display data associated with the pixels in a particular pixel group over the display interface lanes assigned to that pixel group.

With general reference to notations and nomenclature used herein, portions of the detailed description that follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to cover all modifications, equivalents, and alternatives within the scope of the claims.

FIG. 1 is a block diagram of an embodiment of a display interface partitioning system 1000 incorporating a computing device 100 and a display device 160. The computing device 100 may be any of a variety of types of computing devices, including without limitation, a desktop computer system, a data entry terminal, a laptop computer, a netbook computer, a tablet computer, a handheld personal data assistant, a smartphone, a digital camera, a body-worn computing device incorporated into clothing or wearable accessories (e.g., glasses, a watch, etc.) a computing device integrated into a vehicle (e.g., a car, a bicycle, a wheelchair, etc.), a server, a cluster of servers, a server farm, a station, a wireless station, user equipment, and so forth. Furthermore, the computing device 100 may be any of a variety of types of display generating devices, including without limitation, a DVD player, a portable video player, a console video game system, a television receiver, a video content streaming device, and so forth. Embodiments are not limited in this context.

The display device 160 may be any of a variety of types of display devices, including without limitation, an LCD display, a plasma display, an LED display, an OLED display, a projector, and so forth. The computing device 100 and the display 160 are communicatively coupled via display interface 170. In general, the display interface 170 may be any type of interface for transmitting display data from a computing device to a display device, which can be partitioned (as described below). For example, the display interface 170 may be a display port interface, an HDMI interface, a DVI interface, a Thunderbolt interface, or in general any apparatus, device, means, or structure for communicating display data between the computing device 100 and the display 160 that has more than one display interface lane. As used herein, a display interface lane may include a communication pathway, line, cable, frequency, or otherwise, over which data may be communicated. For example, a display port interface may include 2, 4, or 8 display interface lanes that are implemented as twisted pairs of conductors in a display port cable.

In various embodiments, the display device 160 includes two or more TCON-DR sets 162. Said differently, the display device 160 includes multiple TCON-DR sets 162 configured to receive display data through the display interface 170 and cause the display to display an image corresponding to the display data. In some embodiments, the display device 160 may be a display having the TCON-DR sets 162 integrated as COG components. Furthermore, each of the TCON-DR sets 162 may be operative on a different portion of the display 160. For example, the display 160 may be split into a left half and a right half and provided with two TCON-DR sets 162, each operative on a different half of the display 160. In some examples, the TCON-DR sets may only be connected to a portion of the display interface lanes 172. For example, if the display interface 170 includes 4 display interface lanes 172 and the display device 160 includes two TOCN-DR sets 162, the first TCON-DR set 162 may be connected to the first and second display interface lanes 172 while the second TCON-DR set 162 may be connected to the third and fourth display interface lanes 172.

It should be noted that although the computing device 100 is described as a single device, the features of the individual computing device might be incorporated into multiple computing devices. Furthermore, although the computing device 100 is described having various features and functionality (e.g., display functionality) these features may be incorporated into another computing device, peripheral component, or otherwise implemented as a separate device.

It should also be noted, that although the display device 160 is depicted as being external to the computing device 100, both the computing device 100 and the display device 160 may be incorporated into one device.

Additionally, it should be noted, that many examples herein reference two TCON-DR sets 162. However, various embodiments may be provided with more or less TCON-DR sets 162 that referenced in these examples.

In various embodiments, the computing device 100 incorporates one or more of a processor component 110, a graphics-processing unit (GPU) 120, storage 130, controls 140, and an interface 150. The storage 130 stores one or more of a control routine 131, display interface settings 132, pixel groups 133, lane assignments 134, display data 135 and pixel data 136.

In the computing device 100, the control routine 131 incorporates a sequence of instructions operative on the processor component 110 in its role as a main processor component to implement logic to perform various functions. In executing the control routine 131, the processor component 110 receives data corresponding to an image to be displayed by the display device 160 and stores indications of the image as display data 135. As stated above, the image to be displayed may be generated by and/or transmitted from a variety of sources.

In some implementations, display data may be generated by an application executing on the computing device 100 (or another computing device, not shown.) Although not depicted, the computing device 100 may exchange signals conveying display data through a network. For example, the computing device 100 may exchange signals conveying display data (or other data entirely unrelated to the display data) with other computing devices (also not shown) via the network. In various embodiments, the network may be a single network possibly limited to extending within a single building or other relatively limited area, a combination of connected networks possibly extending a considerable distance, and/or may include the Internet. Thus, the computing device 100 may be "networked" to another computing device based on any of a variety (or combination) of communications technologies by which signals may be exchanged, including without limitation, wired technologies employing electrically and/or optically conductive cabling, and wireless technologies employing infrared, radio frequency or other forms of wireless transmission. For example, the computing device 100 may receive display data concerning an image to be displayed by a display device from another computing device associated with a content streaming service. As another example, the computing device 100 may receive display data concerning an image to be presented by a display device from another computing device.

In executing the control routine 131, the processor component 110 receives setting data associated with the display device 160 and the display interface 170 and stores indications of the settings as display interface settings 132. In general, the display interface settings 132 may include indications of the number of display interface lanes 172, the number of TCON-DR sets 162, the portions of the display 160 upon which each of the TCON-DR sets 162 are operative, and/or which display interface lanes 172 are connected to which TCON-DR sets 162.

The control routine 131 further incorporates a sequence of instructions operative on the processor component 110 (e.g., in its role as a main processor component) and/or the GPU 120 (e.g., in its role as a main graphical processing unit) to implement logic to perform various functions. In executing the control routine 131, the processor component 110 and/or the GPU 120 group the pixels corresponding to addressable points on the display device 160 into pixel groups 133. Various grouping examples are described below with reference to FIGS. 4-6. However, in general, the pixels may be grouped based on the display interface settings 132. Said differently, the pixels may be grouped based on the number of TCON-DR sets 162 in the display device 160 and which portions of the display 160 each TCON-DR set 162 is operative on. For example, for a display device having two TCON-DR sets, one operative on the left half of the display device and the other operative on the right half of the display device, a first group of pixels including the pixels having addressable points on the left half of the display device and a second group of pixels including the pixels having addressable points on the right half of the display device may be formed.

Additionally, in executing the control routine 131, the processor component 110 and/or the GPU 120 assigns one or more display interface lanes 172 to each of the pixel groups 133, and saves indications of which display interface lanes 172 are assigned to which pixel groups as lane assignments 134. Various lane assignment examples are described below with reference to FIGS. 4-6. However, in general, the display interface lanes 172 may be assigned to pixel groups 133 based on the number of display interface lanes 172 in the display interface 170, the number of pixel groups 133, and/or which display interface lanes 172 are connected to which TCON-DR sets 162.

Furthermore, in executing the control routine 131, either of the processor component 110 and/or the GPU 120 may transmit the display data 135 to the display device 160 by transmitting pixel data 136 for each of the pixels in a group on the display interface lanes 172 assigned to that particular pixel group. As will be appreciated, a variety of known technologies may be used to transmit display data using a display interface. Furthermore, these technologies may be dependent upon various standards on which the display interface is based. The exact nature of transmitting data using display interfaces is beyond the scope of this disclosure. In general, however, when transmitting the display data 135 to the display device 160, the processor component 110 and/or the GPU 120 may process the display data 135 to generate pixel data (e.g., pixel number, pixel color, or the like) and save indications of the pixel data as pixel data 136, which may be transmitted based on the pixel groups 133 and the lane assignments 134 (refer to FIGS. 4-6.)

In various embodiments, the processor components 110 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the GPU 120 may include any of a wide variety of commercially available graphics processing units. Further, one or more of these graphics processing units may have dedicated memory, multiple-threaded processing and/or some other parallel processing capability.

In various embodiments, the storage 130 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface 150 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
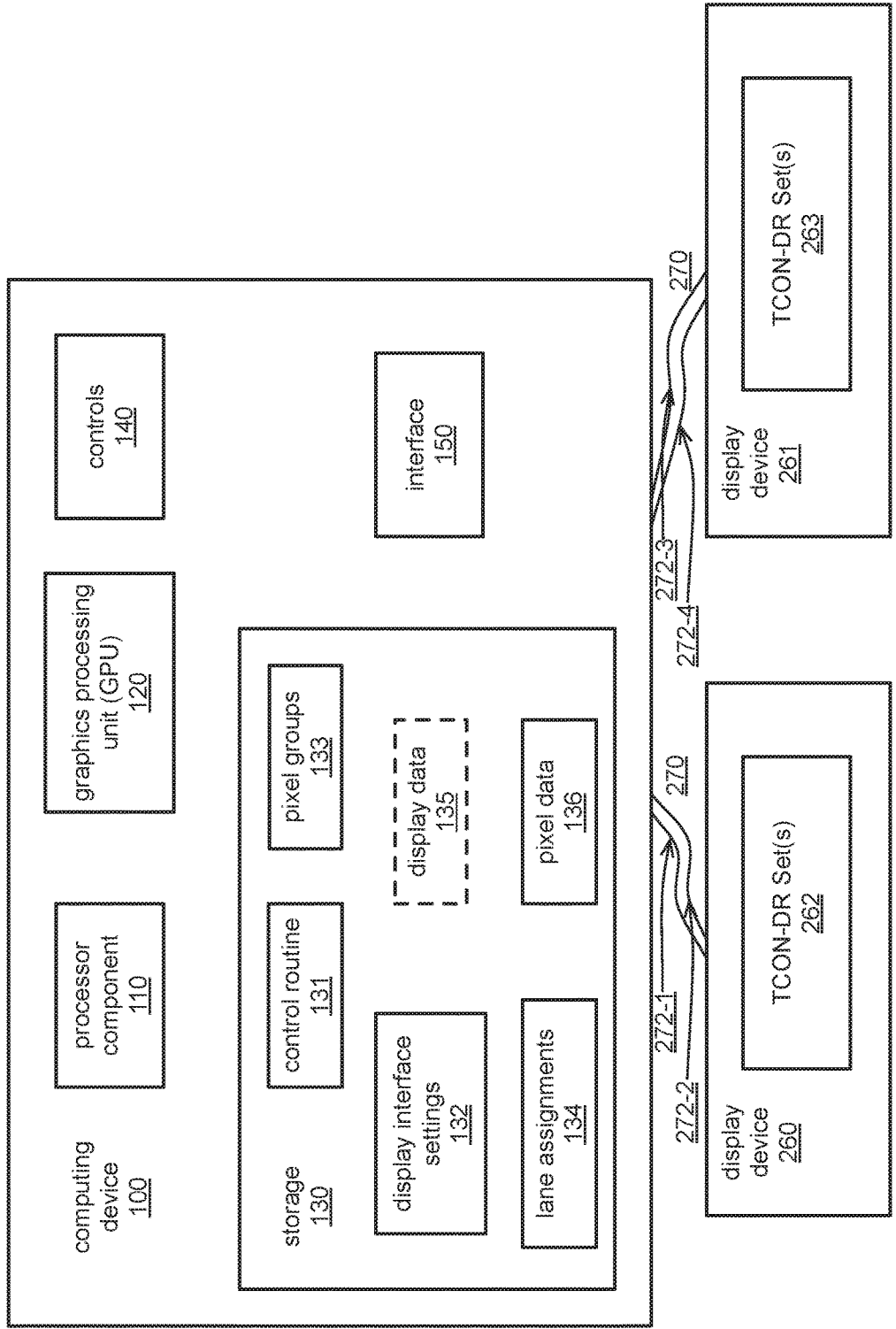

FIG. 2 is a block diagram of an embodiment of a display interface partitioning system 2000. As depicted, the system 2000 includes the computing device 100 (described above with reference to FIG. 1) and display devices 260 and 261. The display devices 260 and 261, like the display device 160, may be any of a variety of types of display devices, including without limitation, an LCD display, a plasma display, an LED display, an OLED display, a projector, and so forth. The computing device 100 and the display devices 260 and 261 are communicatively coupled via display interface 270. In general, the display interface 270, like the display interface 170, may be any type of interface for transmitting display data from a computing device to a display device, which can be partitioned (as described below). For example, the display interface 270 may be a display port interface, an HDMI interface, a DVI interface, a Thunderbolt interface, or in general any apparatus, device, means, or structure for communicating display data between the computing device 100 and the display devices 260 and 261, which has more than one display interface lane.

The display devices 261 and 261 each include one or more TCON-DR sets 262 and 263, respectively. The TCON-DR sets 262 and 263, like the TCON-DR sets 162, are configured to receive display data through the display interface 270 and cause the display to display an image based on the display data. In some embodiments, the display devices 260 and 261 may be displays having the TCON-DR sets integrated as COG components.

It should be noted, that although the display devices 260 and 261 are depicted as being external to the computing device 100, the computing device 100 and the display devise 260 and 261 may be incorporated into one device.

Operation of the system 2000 is similar to that described with respect to the operation of the system 1000 above in conjunction with FIG. 1. It is important to note, however, that the display settings 132 may include indications of the number of TCON-DR sets 262 and 263 in each of the displays 260 and 261. Furthermore, the display settings 132 may include indications of the connection of the display interface lanes 272 with respect to each of the TCON-DR sets 262 and 263. Accordingly, in executing the control routine 131, either the processor component 110 and/or the GRU 120 may group pixels and assign lanes as described above and save indications of these groups and assignments as pixel groups 133 and lane assignments 134. The grouping and lane assignments may be based on the TCON-DR sets 262 and 263, the pixels of the display devices 260 and 261 with which these TCON-DR sets are operative upon and the connectivity of the display interface lanes 272. It is to be appreciated, that FIGS. 1-2 are given for illustration is noting that the present disclosure is applicable to partitioning a display interface to route display data to multiple TCON-DR sets, irrespective of whether the TCON-DR sets are included in a single display device or multiple display devices.

Furthermore, it is noted, that although the display devices 260 and 261 are shown connected to the computing device 100 in parallel in FIG. 2, some embodiments may provide that the display devices 260 and 261 are connected in series, sometimes referred to as daisy chained.

Figure 3:
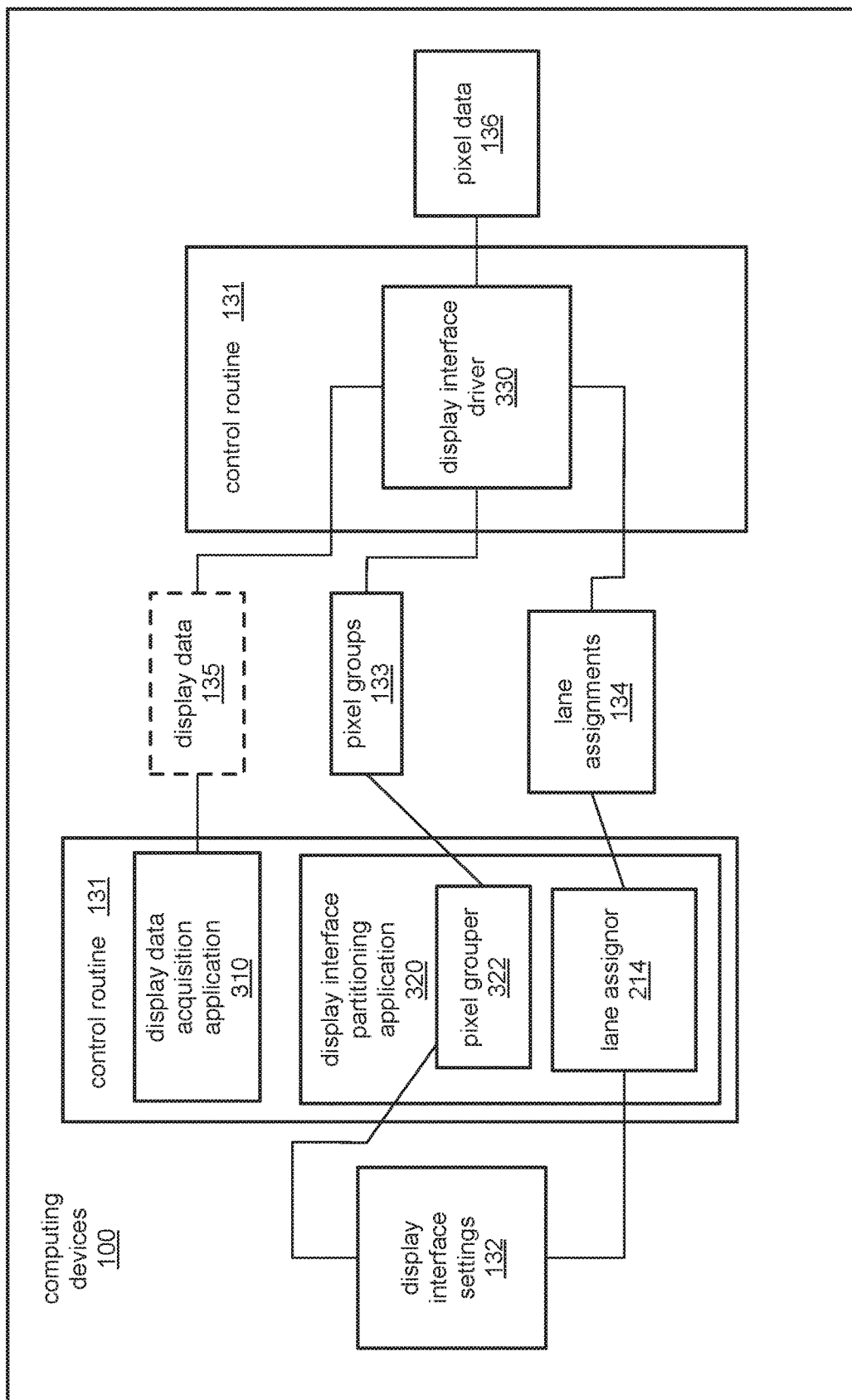
FIG. 3 illustrates a portion of an embodiment of the display interface partitioning system.

FIG. 3 is simplified block diagram of a portion of an embodiment of the display interface partitioning system 1000 of FIG. 1. In particular, FIG. 3 depicts aspects of grouping pixels corresponding to addressable points on the display device into pixel groups, assigning display interface lanes to the groups and transmitting display data based on the pixel groups and the lane assignments. Although reference to the system 1000 and FIG. 1 is made when describing various examples in conjunction with FIG. 3, various embodiments are equally applicable to the system 2000 depicted in FIG. 2. That is, the aspects depicted in FIG. 3 are applicable to partitioning a display interface for use with multiple TCON-DR sets, irrespective of whether the TCON-DR sets are incorporated into a single display device or multiple display devices.

In various embodiments, the control routine 131 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor component 110 and/or the GPU 120. Where one or more device drivers are included, those device drivers may provide support for any of a variety of other components, whether hardware or software components of the computer system 100.

Control routine 131 may include or be otherwise linked to interface 150 executable by the processor component 110 and/or the GPU 120 to operate the display interface 170 to transmit and receive signals as has been described. Among the signals received may be signals conveying the display data 135. As familiar to those skilled in the art, each of these communications components is selected to be operable with whatever type of interface technology is selected to implement the interface 150 and the display interface 170.

Furthermore, the control routine 131 may be implemented as a controller, processor, or other computing component (e.g., the processor component 110, the GPU 120, or the like) that includes logic, at least a portion of which is in hardware, the logic to perform the functions described herein.

Turning more specifically to FIG. 3, a display data acquisition application 310, a display interface partitioning application 320, and a display interface driver 330 are provided as part of the control routine 131. The display data acquisition application 310 receives the display data 135. It is noted, that display data 135 may take on a variety of forms, such as, for example, still images, movies, computer generated images, or otherwise any image to be displayed by a display device. It will be appreciated, however, that a wide variety of techniques for storing and representing display data are known. Furthermore, the exact nature and format of the display data 135 may depend upon the implementation, the architecture of the computing device 100, the processor component 110, the GPU 120, the display interface 170, and/or the hardware or software used to implement the display interface portioning application 320.

As will be appreciated, the display data 135 may include indication of, or information corresponding to pixel data. Said differently, the display data 135 may include indications corresponding to the particular color or colors to display for each of the pixels of the display device 160 in order to display the image corresponding to the display data 135.

Figure 4:
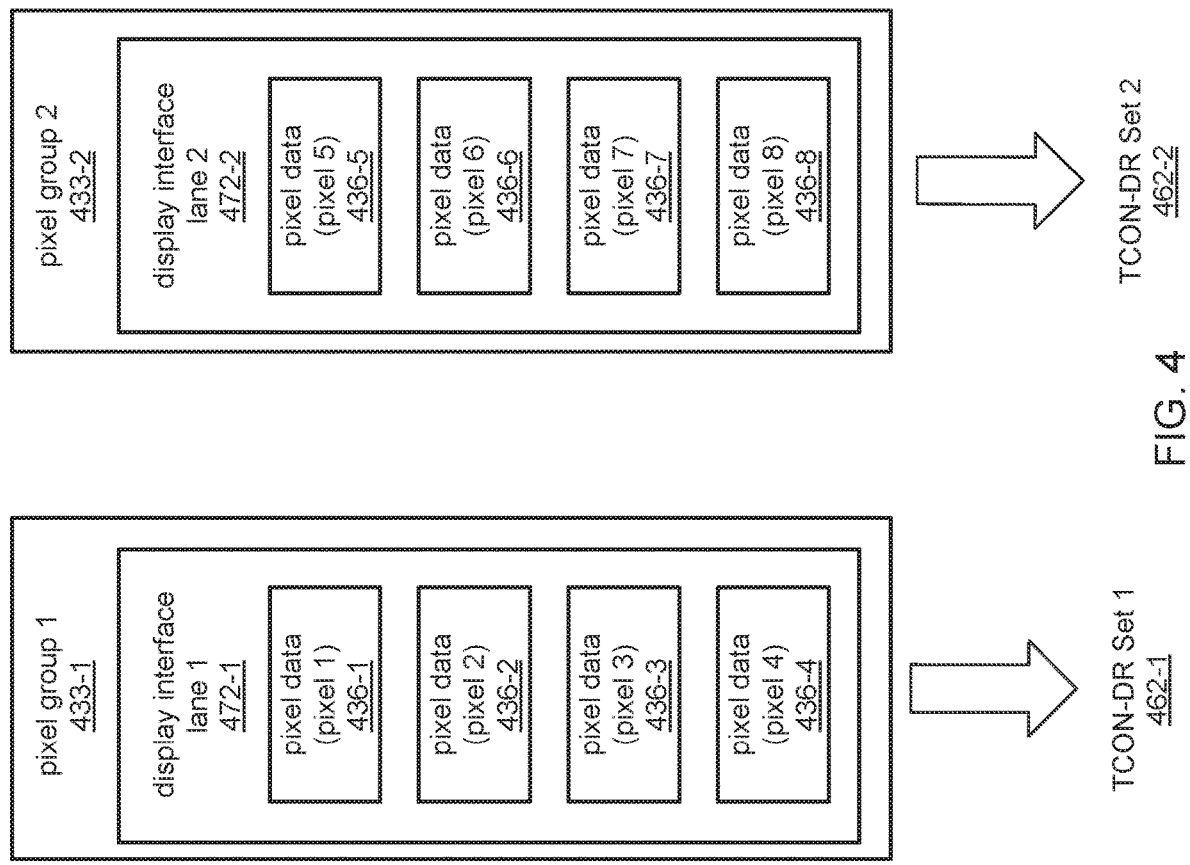
FIGS. 4-6 each illustrate partitioning a display interface according to an embodiment.
Figure 5:
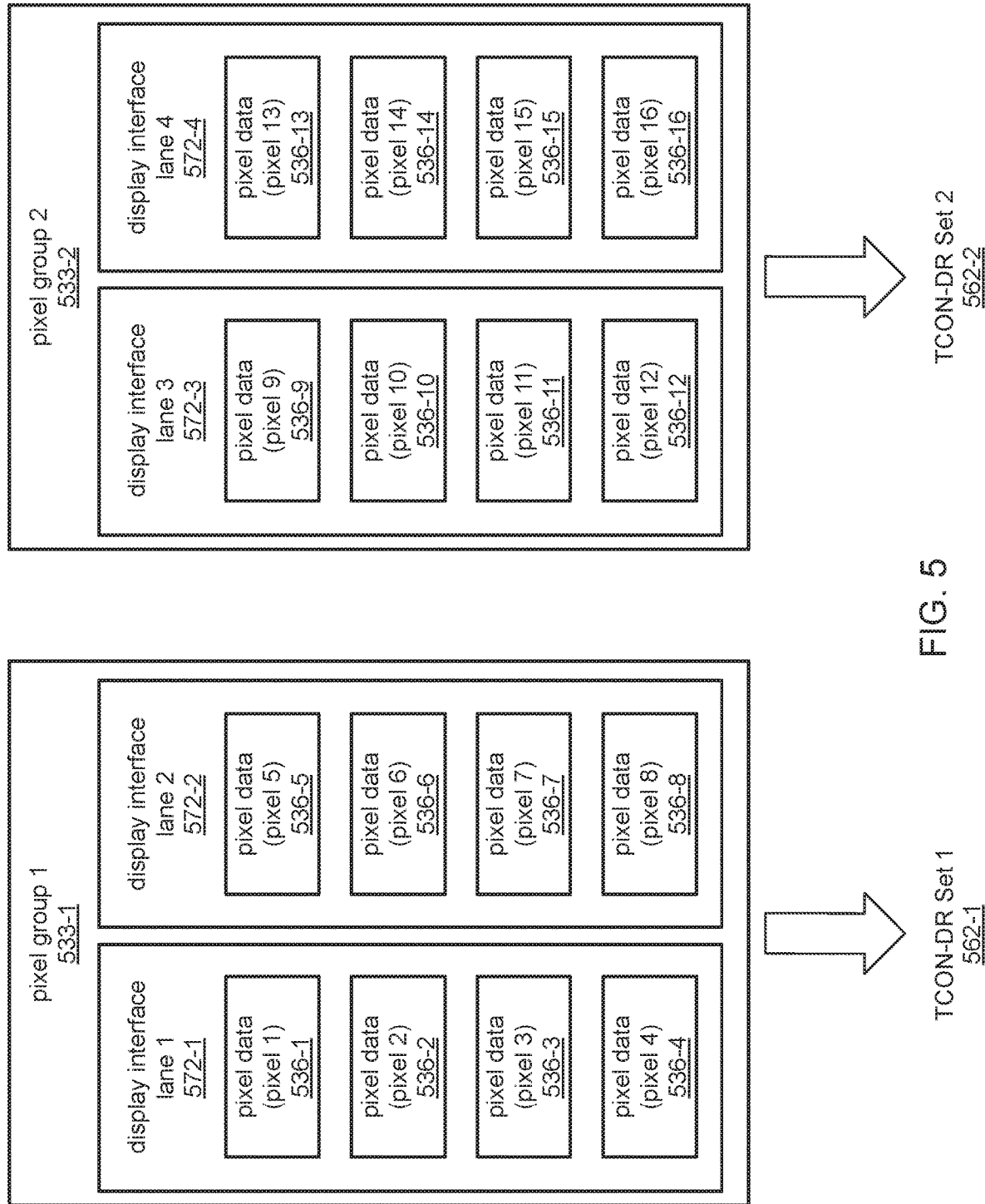
Figure 6:
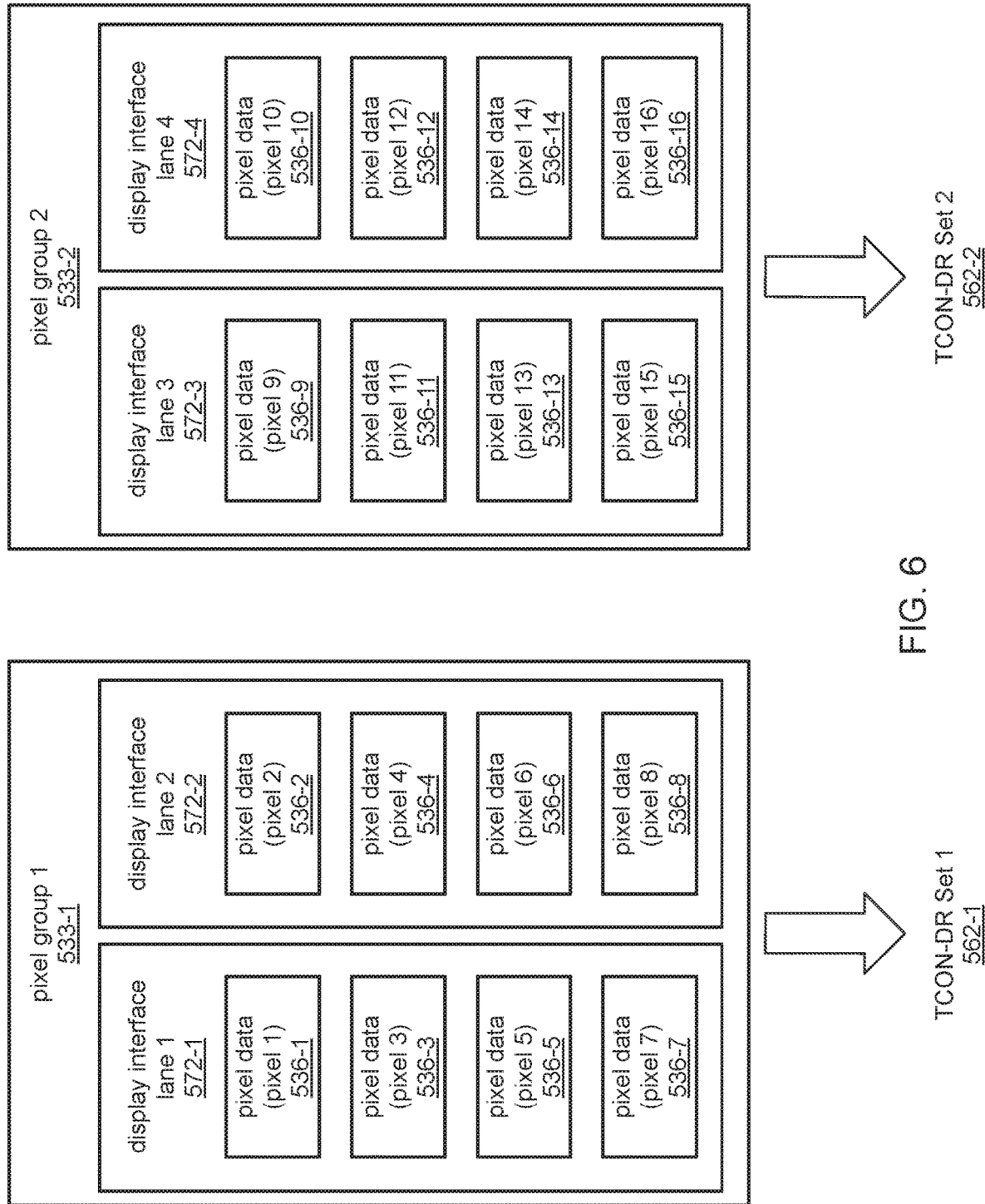

The display interface partitioning application 320 includes a pixel grouper 322 to generate the pixel groups 133 (refer to FIGS. 4-6.) In general, pixel groups 133 may be formed for each of the TCON-DR sets 162. As will be appreciated, the TCON-DR sets 162 are operative on different portions (e.g., different halves, or the like) of the display device 160. Accordingly a group for each of these portions of the display device 160 may be formed and the pixels in each respective portion associated with the corresponding groups.

The display interface partitioning application 320 further includes a lane assignor 324 to assign one or more of the display interface lanes 172 to each of the pixel groups 133 (refer to FIGS. 4-6.) In general, each of the display interface lanes 172 may be assigned to one of the pixel groups based on the number of TCON-DR sets 162 and/or the connectivity of the TCON-DR sets to the display interface lines.

The display interface driver 330 communicates the display data 135 to the display device 160 by transmitting pixel data 136 based on the pixel groups 133 and the lane assignments 134 (refer to FIGS. 4-6.) In general, pixel data for each of the pixels in a group is transmitted over the display interface lines 172 assigned to that group. As noted above, any of a variety of known techniques for and transmitting pixel data may be implemented. It is to be appreciated, that display interface driver 330 may extract the pixel data 136 (e.g., RGB color data, or the like) from the display data 135 and then transmit the pixel data 136 corresponding to the pixels in a particular group over the display interface lanes assigned to that group.

FIGS. 4-6 depict various examples of pixel groups 133, lane assignments 134, and pixel data 136. It should be noted that FIGS. 4-6 depict extremely simplified views of the pixels and pixel data. In particular it is envisioned that the present disclosure be applied to displays having many more pixels than depicted. Additionally, examples showing 2 pixel groups are shown. It is envisioned that more or less than the number of depicted pixel groups 133 may be implemented. Additionally, examples showing 2 and 4 display interface lanes are shown. However, it is envisioned that more than 4 display interface lanes may be used. Additionally, although only 2 TCON-DR sets are depicted in these examples, the examples may be scaled to be implemented with more than 2 TCON-DR sets. Furthermore, lane assignments need not necessarily be in order of 2 as depicted. More specifically, an odd number of lanes may be assigned to a group. In general, FIGS. 4-6 show examples of pixel groups that may be formed and transmitted on display interface lanes such that TCON-DR sets do not receive pixel data for pixels that the TCON-DR set is not operative on. As such, a reduction in the power consumption and bandwidth requirements necessary to communicate display data may be realized.

It is noted, that FIGS. 4-6 use similar numbering conventions for the depicted components for ease of reference to FIGS. 1-3. For example, FIG. 4 depicts pixel groups 433, which may correspond to pixel groups 133 depicted in FIGS. 1-3.

Turning more specifically to FIG. 4, an example of partitioning a 2-lane display interface is shown. Particularly, first pixels group 433-1 and second pixel group 433-2 are shown. Each of the pixel groups 433 is shown including 4 pixels. Particularly, the first pixel group 433-1 is shown including pixels 1-4 and the second pixel group 433-2 is shown including pixels 5-8. Furthermore, a first display interface lane 472-1 is shown assigned to the first pixel group 433-1 and a second display interface lane 472-2 is shown assigned to the second pixel group 433-2. Accordingly, during operation of the system 1000, pixel data 436-1 to 436-4 corresponding to display data for each of the pixels in the first pixel group 433-1 may be transmitted to a first TCON-DR set 462-1 over the first display interface lane 472-1 while pixel data 436-5 to 436-8 corresponding to display data for each of the pixels in the second pixel group 433-2 may be transmitted to a second TCON-DR set 462-2 over the second display interface lane 472-2.

Turning more specifically to FIG. 5, an example of partitioning a 4-lane display interface is shown. Particularly, first pixel group 533-1 and second pixel group 533-2 are shown. Each of the pixel groups 533 is shown including 8 pixels. Particularly, the first pixel group 533-1 is shown including pixels 1-8 and the second pixel group 533-2 is shown including pixels 9-16. Furthermore, first and second display interface lanes 572-1 and 572-2 are shown assigned to the first pixel group 533-1 while third and fourth display interface lanes 572-3 and 572-4 are shown assigned to the second pixel group 133-2. Accordingly, during operation of the system 1000, pixel data 536-1 to 536-8 corresponding to display data for each of the pixels in the first pixel group 533-1 may be transmitted to a first TCON-DR set 562-1 over the first and second display interface lanes 572-1 and 572-2 while pixel data 536-9 to 536-16 corresponding to display data for each of the pixels in the second pixel group 533-2 may be transmitted to a second TCON-DR set 162-2 over the third and fourth display interface lane 572-3 and 572-4.

It is noted, that the pixel delivery for a group of pixel where more than one display interface lane is assigned to the group (e.g., as illustrated in FIG. 5) may be serialized (e.g., as illustrated in FIG. 5) or staggered (refer to FIG. 6).

Turning more specifically to FIG. 6, the example shown in FIG. 5 is depicted. As will be appreciated, the pixel data 136 is transmitted in a staggered fashion as opposed to serialized on each display lane 572. More specifically, pixel data 536-1 may be transmitted on display interface lane 572-1, pixel data 536-2 may be transmitted on display interface lane 572-2, pixel data 536-3 may be transmitted on display interface lane 572-1, etc.

Figure 7:
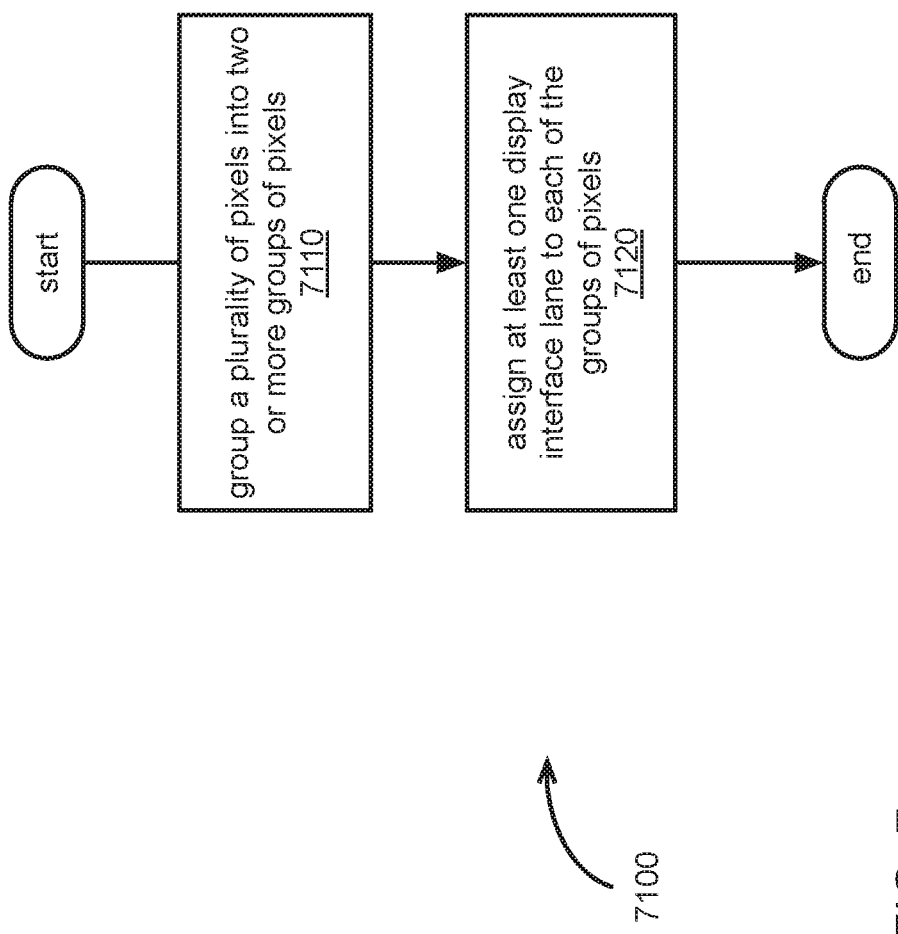
FIG. 7 illustrates a logic flow according to an embodiment.

FIG. 7 illustrates one embodiment of a logic flow 7100. The logic flow 7100 may be representative of some or all of the operations executed by one or more embodiments described herein. More specifically, the logic flow 7100 may illustrate operations performed by the processor component 110 and/or the GPU 120 in executing at least the control routine 131, and/or performed by other component(s) of the computing device 100.

At 7110, a processor component and/or a GPU of a computing device of a display interface partitioning system (e.g., the processor component 110 and/or the GPU 120 of the computing device 100 of the display interface partitioning system 1000 or 2000) is caused by execution of a display interface partitioning application of a control routine to group a plurality of pixels into two or more groups of pixels, each of the plurality of pixels corresponding to an addressable point on a display device. For example, the display interface partitioning application 320 may group pixels corresponding to addressable locations on either the display device 160 (or the display devices 260 and 261) into pixel groups 133. In some examples, the pixels may be grouped based on TCON-DR sets 162 (or 262 and 263) corresponding to the display devices and which pixels of the display devices the TCON-DR sets are operative on.

In some examples, a pixel group may be formed for each TCON-DR set, where the pixel group includes the pixels that the respective TOCN-DR set is operative on.

At 7120, the processor component and/or the GPU of the computing device of the display interface partitioning system (e.g., the processor component 110 and/or the GPU 120 of the computing device 100 of the display interface partitioning system 1000 or 2000) is caused by execution of a display interface partitioning application of a control routine to assign at least one display interface lane of a display interface to each of the pixel groups. For example, the display interface partitioning application 320 may assign display interface lanes 172 (or 272) to the pixel groups 133. In some examples, a display interface lane may be assigned to a pixel group based on the TCON-DR set corresponding to the pixel group and the connectivity of the TCON-DR set to the display interface.

As can be seen from FIGS. 4-6, pixel data corresponding to display data having indications of an image to be displayed may be transmitted to multiple TOCN-DR sets over a display interface without necessitating each TCON-DR set receive all the pixel data. More specifically, the display interface may be partitioned and pixel data corresponding to a TCON-DR set transmitted to the TCON-DR set over one of the partitions.

Figure 8:
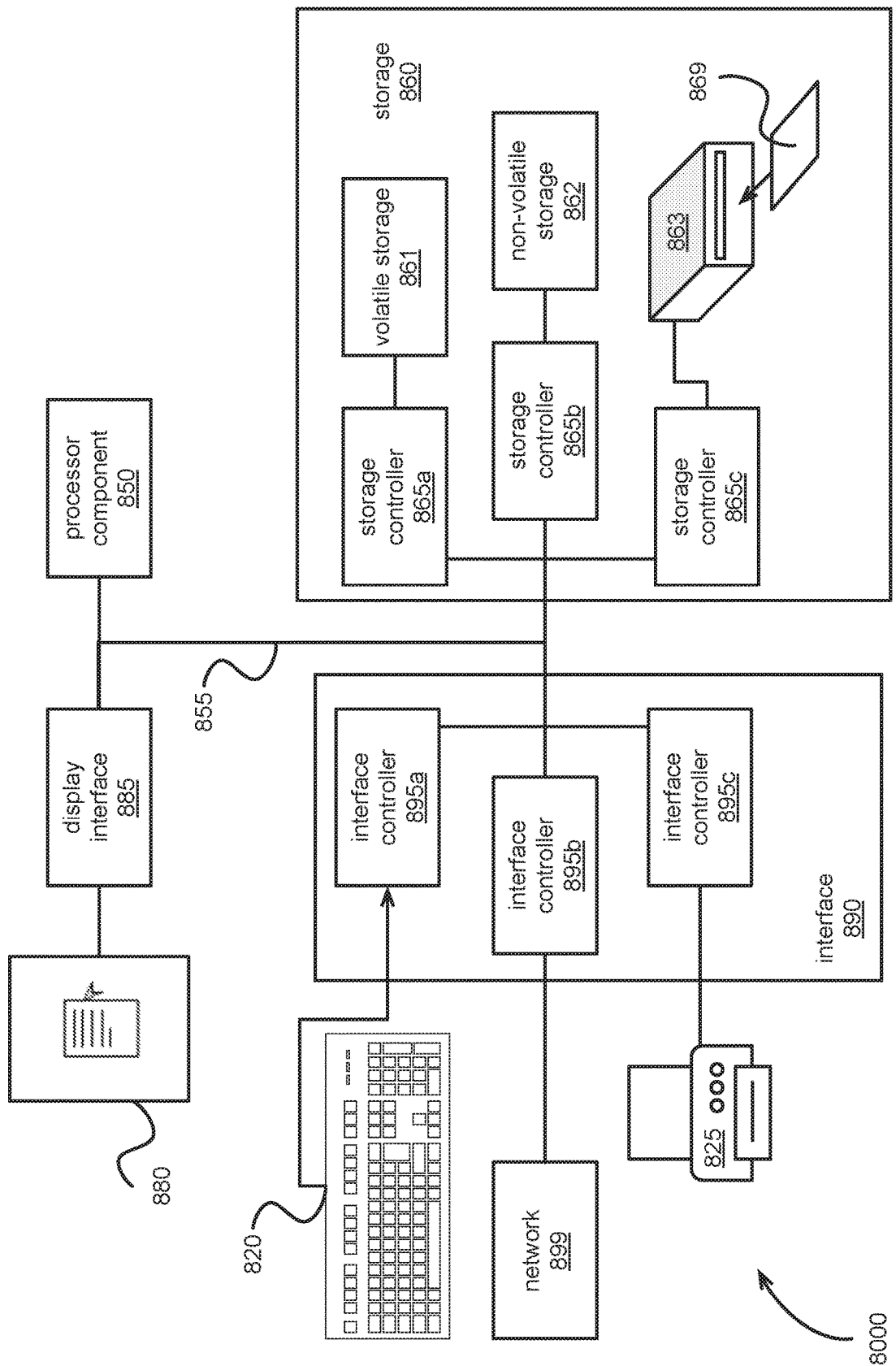
FIG. 8 illustrates a processing architecture according to an embodiment.

FIG. 8 illustrates an embodiment of an exemplary processing architecture 8000 suitable for implementing various embodiments as previously described. More specifically, the processing architecture 8000 (or variants thereof) may be implemented as part of the computing device 100.

The processing architecture 8000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 8000, a computing device may include at least a processor component 850, storage 860, an interface 890 to other devices, and a coupling 855. As will be explained, depending on various aspects of a computing device implementing the processing architecture 8000, including its intended use and/or conditions of use, such a computing device may further include additional components, such as without limitation, a display interface 885.

The coupling 855 may include one or more buses, point-to-point interconnects, transceivers, buffers, crosspoint switches, and/or other conductors and/or logic that communicatively couples at least the processor component 850 to the storage 860. Coupling 855 may further couple the processor component 850 to one or more of the interface 890, the audio subsystem 870 and the display interface 885 (depending on which of these and/or other components are also present). With the processor component 850 being so coupled by couplings 855, the processor component 850 is able to perform the various ones of the tasks described at length, above, for whichever one(s) of the aforedescribed computing devices implement the processing architecture 8000. Coupling 855 may be implemented with any of a variety of technologies or combinations of technologies by which signals are optically and/or electrically conveyed. Further, at least portions of couplings 855 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 850 (corresponding to the processor component 110) may include any of a wide variety of commercially available processors, employing any of a wide variety of technologies and implemented with one or more cores physically combined in any of a number of ways.

As previously discussed, the storage 860 (corresponding to the storage 130) may be made up of one or more distinct storage devices based on any of a wide variety of technologies or combinations of technologies. More specifically, as depicted, the storage 860 may include one or more of a volatile storage 861 (e.g., solid state storage based on one or more forms of RAM technology), a non-volatile storage 862 (e.g., solid state, ferromagnetic or other storage not requiring a constant provision of electric power to preserve their contents), and a removable media storage 863 (e.g., removable disc or solid state memory card storage by which information may be conveyed between computing devices). This depiction of the storage 860 as possibly including multiple distinct types of storage is in recognition of the commonplace use of more than one type of storage device in computing devices in which one type provides relatively rapid reading and writing capabilities enabling more rapid manipulation of data by the processor component 850 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 861 may be communicatively coupled to coupling 855 through a storage controller 865*a* providing an appropriate interface to the volatile storage 861 that perhaps employs row and column addressing, and where the storage controller 865*a* may perform row refreshing and/or other maintenance tasks to aid in preserving information stored within the volatile storage 861. By way of another example, where the non-volatile storage 862 is present and includes one or more ferromagnetic and/or solid-state disk drives, the non-volatile storage 862 may be communicatively coupled to coupling 855 through a storage controller 865*b* providing an appropriate interface to the non-volatile storage 862 that perhaps employs addressing of blocks of information and/or of cylinders and sectors. By way of still another example, where the removable media storage 863 is present and includes one or more optical and/or solid-state disk drives employing one or more pieces of machine-readable storage medium 869, the removable media storage 863 may be communicatively coupled to coupling 855 through a storage controller 865*c* providing an appropriate interface to the removable media storage 863 that perhaps employs addressing of blocks of information, and where the storage controller 865*c* may coordinate read, erase and write operations in a manner specific to extending the lifespan of the machine-readable storage medium 869.

One or the other of the volatile storage 861 or the non-volatile storage 862 may include an article of manufacture in the form of a machine-readable storage media on which a routine including a sequence of instructions executable by the processor component 850 to implement various embodiments may be stored, depending on the technologies on which each is based. By way of example, where the non-volatile storage 862 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 862 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 850 to implement various embodiments may initially be stored on the machine-readable storage medium 869, and the removable media storage 863 may be subsequently employed in copying that routine to the non-volatile storage 862 for longer term storage not requiring the continuing presence of the machine-readable storage medium 869 and/or the volatile storage 861 to enable more rapid access by the processor component 850 as that routine is executed.

As previously discussed, the interface 890 (possibly corresponding to the interfaces 150, 170, and/or 270) may employ any of a variety of signaling technologies corresponding to any of a variety of communications technologies that may be employed to communicatively couple a computing device to one or more other devices. Again, one or both of various forms of wired or wireless signaling may be employed to enable the processor component 850 to interact with input/output devices (e.g., the depicted example keyboard 820 or printer 825) and/or other computing devices, possibly through a network or an interconnected set of networks. In recognition of the often greatly different character of multiple types of signaling and/or protocols that must often be supported by any one computing device, the interface 890 is depicted as including multiple different interface controllers 895*a*, 895*b* and 895*c*. The interface controller 895*a* may employ any of a variety of types of wired digital serial interface or radio frequency wireless interface to receive serially transmitted messages from user input devices, such as the depicted keyboard 820. The interface controller 895*b* may employ any of a variety of cabling-based or wireless signaling, timings and/or protocols to access other computing devices through the depicted network 899 (perhaps a network made up of one or more links, smaller networks, or perhaps the Internet). The interface 895*c* may employ any of a variety of electrically conductive cabling enabling the use of either serial or parallel signal transmission to convey data to the depicted printer 825. Other examples of devices that may be communicatively coupled through one or more interface controllers of the interface 890 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 880, corresponding to one or more of the displays 160, 260, and/or 261), such a computing device implementing the processing architecture 8000 may also include the display interface 885. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 885 in a communicative coupling of the display 880 may make use of signaling and/or protocols that conform to any of a variety of industry standards, including without limitation, any of a variety of analog video interfaces, Digital Video Interface (DVI), DisplayPort, Thunderbolt, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operatve operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of a controller to partition a display interface, the controller comprising logic at least a portion of which is in hardware, the logic to group a plurality of pixels into two or more groups of pixels, each of the plurality of pixels corresponding to an addressable point on a display device; and assign one or more display interface lanes of a plurality of display interface lanes to each of the two or more groups of pixels, the plurality of display interface lanes configured to communicate display data to the display device, the display data including indications of an image to be displayed by the display device.

The above example of a controller, wherein the logic includes a graphics-processing unit (GPU).

The above example of a controller, wherein the plurality of display interface lanes include a first display interface lane and a second display interface lane and wherein the two or more groups of pixels include a first group of pixels and a second group of pixels, the logic to assign the first display interface lane to the first group of pixels and the second display interface lane to the second group of pixels.

The above example of a controller, the logic to acquire the display data.

The above example of a controller, wherein the display data includes indications of pixel colors for each of the plurality of pixels.

The above example of a controller, the logic to communicate the pixel colors for each of the plurality of pixels by transmitting the pixel colors for the pixels corresponding to the first group of pixels to the display device using the first display interface lane and transmitting the pixel colors for the pixels corresponding to the second group of pixels to the display device using the second display interface lane.

The above example of a controller, wherein the plurality of display interface lanes include a first display interface lane, a second display interface lane, a third display interface lane, and a fourth display interface lane and wherein the two or more groups of pixels include a first group of pixels and a second group of pixels, the logic to assign the first and second display interface lanes to the first group of pixels and the third and fourth display interface lanes to the second group of pixels.

The above example of a controller, wherein the display device includes a first timing controller and driver (TCON-DR) set operative on a first subset of the plurality of pixels and a second TCON-DR set operative on a second subset of the plurality of pixels, the two or more groups of pixels including a first group of pixels and a second group of pixels, the logic to associate the first subset of pixels with the first group of pixels and the second subset of pixels with the second group of pixels, the first subset of pixels including different pixels than the second subset of pixels.

The above example of a controller, wherein the first and second TCON-DR sets are Chip-on-Glass components on the display device.

The above example of a controller, wherein the display device is a first display device, each of the plurality of pixels corresponding to an addressable point on either the first display device or a second display device.

The above example of a controller, wherein the display device is an LCD, an LED, an OLED, or a plasma display.

The above example of a controller, wherein the display interface is a display port interface, an HDMI interface, a DVI interface, or a Thunderbolt interface.

The above example of a controller, the logic to transmit the pixel colors using the display interface lines by staggering the transmission across the display interface lines assigned to each pixel group.

The above example of a controller, the logic to transmit the pixel colors using the display interface lines by serializing the transmission across the display interface lines assigned to each pixel group.

The above example of a controller, the logic to transmit the pixel color on either the first display interface lane or the second display interface layer while not transmitting the pixel color on the other display interface lane.

An example of at least one machine-readable storage medium comprising instructions that when executed by a computing device, cause the computing device to acquire display data, the display data including indications of an image to be displayed by a display device; group a plurality of pixels into two or more groups of pixels, each of the plurality of pixels corresponding to an addressable point on the display device; and assign one or more display interface lanes of a plurality of display interface lanes to each of the two or more groups of pixels, the plurality of display interface lanes configured to communicate the display data to the display device.

The above example of at least one machine-readable storage medium, wherein the plurality of display interface lanes include a first display interface lane and a second display interface lane and wherein the two or more groups of pixels include a first group of pixels and a second group of pixels, the computing device to assign the first display interface lane to the first group of pixels and assigning the second display interface lane to the second group of pixels.

The above example of at least one machine-readable storage medium, wherein the plurality of display interface lanes include a first display interface lane, a second display interface lane, a third display interface lane, and a fourth display interface lane and wherein the two or more groups of pixels include a first group of pixels and a second group of pixels, the computing device to assign the first and second display interface lanes to the first group of pixels and assigning the third and fourth display interface lanes to the second group of pixels.

The above example of at least one machine-readable storage medium, wherein the display device includes a first timing controller and driver (TCON-DR) set operative on a first subset of the plurality of pixels and a second TCON-DR set operative on a second subset of the plurality of pixels, the two or more groups of pixels including a first group of pixels and a second group of pixels, the computing device to associate the first subset of pixels with the first group of pixels and associating the second subset of pixels with the second group of pixels, the first subset of pixels including different pixels than the second subset of pixels.

The above example of at least one machine-readable storage medium, wherein the display device is a first display device, each of the plurality of pixels corresponding to an addressable point on either the first display device or a second display device.

An example of a processor to partition a display interface, the processor comprising logic at least a portion of which is in hardware, the logic to group a plurality of pixels into two or more groups of pixels, each of the plurality of pixels corresponding to an addressable point on either a first display device or a second display device; and assign one or more display interface lanes of a plurality of display interface lanes to each of the two or more groups of pixels, the plurality of display interface lanes configured to communicate display data to the first and second display devices, the display data including indications of an image to be displayed by the first and second display devices.

The above example of a processor, wherein the first display device includes a first timing controller and driver (TCON-DR) set operative on a first subset of the plurality of pixels, the first subset of the plurality of pixels corresponding to the pixels of the first display device and the second display device includes a second TCON-DR set operative on a second subset of the plurality of pixels, the second subset of the plurality of pixels corresponding to the pixels of the second display device, the two or more groups of pixels including a first group of pixels and a second group of pixels, the logic to associate the first subset of pixels with the first group of pixels and the second subset of pixels with the second group of pixels.

The above example of a processor, wherein the plurality of display interface lanes include a first display interface lane and a second display interface lane, the logic to assign the first display interface lane to the first group of pixels and the second display interface lane to the second group of pixels.

The above example of a processor, wherein the plurality of display interface lanes include a first display interface lane, a second display interface lane, a third display interface lane, and a fourth display interface lane, the logic to assign the first and second display interface lanes to the first group of pixels and the third and fourth display interface lanes to the second group of pixels.

The above example of a processor, the logic to acquire the display data.

The above example of a processor, wherein the display data includes indications of pixel colors for each of the plurality of pixels.

The above example of a processor, the logic to communicate the pixel colors for each of the plurality of pixels by transmitting the pixel colors for the pixels corresponding to the first group of pixels to the display device using a first display interface lane and transmitting the pixel colors for the pixels corresponding to the second group of pixels to the display device using a second display interface lane.

The above example of a processor, wherein the first and second TCON-DR sets are Chip-on-Glass components on the first and second display devices.

The above example of a processor, wherein the first and second display device are an LCD, an LED, an OLED, or a plasma display.

The above example of a processor, wherein the display interface is a display port interface, an HDMI interface, a DVI interface, or a Thunderbolt interface.

The above example of a processor, the logic to transmit the pixel colors using the display interface lines by staggering the transmission across the display interface lines assigned to each pixel group.

The above example of a processor, the logic to transmit the pixel colors using the display interface lines by serializing the transmission across the display interface lines assigned to each pixel group.

An example of at least one machine-readable storage medium comprising instructions that when executed by a computing device, cause the computing device to group a plurality of pixels into two or more groups of pixels, each of the plurality of pixels corresponding to an addressable point on either a first display device or a second display device; and assign one or more display interface lanes of a plurality of display interface lanes to each of the two or more groups of pixels, the plurality of display interface lanes configured to communicate display data to the first and second display devices, the display data including indications of an image to be displayed by the first and second display devices.

The above example of at least one machine-readable storage medium, wherein the first display device includes a first timing controller and driver (TCON-DR) set operative on a first subset of the plurality of pixels, the first subset of the plurality of pixels corresponding to the pixels of the first display device and the second display device includes a second TCON-DR set operative on a second subset of the plurality of pixels, the second subset of the plurality of pixels corresponding to the pixels of the second display device, the two or more groups of pixels including a first group of pixels and a second group of pixels, the computing device to associate the first subset of pixels with the first group of pixels and the second subset of pixels with the second group of pixels.

An example of a system to partition a display interface, the system comprising logic a portion of which is in hardware, the logic to group a plurality of pixels into two or more groups of pixels, each of the plurality of pixels corresponding to an addressable point on either a first display device or a second display device; and assign one or more display interface lanes of a plurality of display interface lanes to each of the two or more groups of pixels, the plurality of display interface lanes configured to communicate display data to the first and second display devices, the display data including indications of an image to be displayed by the first and second display devices.

The above example of a system, wherein the first display device includes a first timing controller and driver (TCON-DR) set operative on a first subset of the plurality of pixels, the first subset of the plurality of pixels corresponding to the pixels of the first display device and the second display device includes a second TCON-DR set operative on a second subset of the plurality of pixels, the second subset of the plurality of pixels corresponding to the pixels of the second display device, the two or more groups of pixels including a first group of pixels and a second group of pixels, the logic to associate the first subset of pixels with the first group of pixels and the second subset of pixels with the second group of pixels.

An example of a computing-implemented method for partitioning a display interface comprising grouping a plurality of pixels into two or more groups of pixels, each of the plurality of pixels corresponding to an addressable point on a display device; and assigning one or more display interface lanes of a plurality of display interface lanes to each of the two or more groups of pixels, the plurality of display interface lanes configured to communicate display data to the display device, the display data including indications of an image to be displayed.

The above example of a computing-implemented method, wherein the plurality of display interface lanes include a first display interface lane and a second display interface lane and wherein the two or more groups of pixels include a first group of pixels and a second group of pixels, the method further comprising assigning the first display interface lane to the first group of pixels and assigning the second display interface lane to the second group of pixels.

The above example of a computing-implemented method, further comprising acquiring the display data.

The above example of a computing-implemented method, wherein the display data includes indications of pixel colors for each of the plurality of pixels.

The above example of a computing-implemented method, further comprising transmitting the pixel colors for the pixels corresponding to the first group of pixels to the display device using the first display interface lane and transmitting the pixel colors for the pixels corresponding to the second group of pixels to the display device using the second display interface lane.

The above example of a computing-implemented method, wherein the plurality of display interface lanes include a first display interface lane, a second display interface lane, a third display interface lane, and a fourth display interface lane and wherein the two or more groups of pixels include a first group of pixels and a second group of pixels, the method further comprising assigning the first and second display interface lanes to the first group of pixels and assigning the third and fourth display interface lanes to the second group of pixels.

The above example of a computing-implemented method, wherein the display device includes a first timing controller and driver (TCON-DR) set operative on a first subset of the plurality of pixels and a second TCON-DR set operative on a second subset of the plurality of pixels, the two or more groups of pixels including a first group of pixels and a second group of pixels, the method further comprising associating the first subset of pixels with the first group of pixels and associating the second subset of pixels with the second group of pixels, the first subset of pixels including different pixels than the second subset of pixels.

The above example of a computing-implemented method, wherein the first and second TCON-DR sets are Chip-on-Glass components on the display device.

The above example of a computing-implemented method, wherein the display device is a first display device, each of the plurality of pixels corresponding to an addressable point on either the first display device or a second display device.

The above example of a computing-implemented method, wherein the display device is an LCD, an LED, an OLED, or a plasma display.

The above example of a computing-implemented method, wherein the display interface is a display port interface, an HDMI interface, a DVI interface, or a Thunderbolt interface.

An example of at least one machine-readable storage medium comprising instructions that when executed by a computing device, cause the computing device to perform any of the above example computing-implemented methods.

An example of an apparatus to partition a display interface comprising means for performing any of the above example computing-implemented methods.

An example of at least one machine-readable storage medium comprising instructions that when executed by a computing device, cause the computing device to acquiring display data, the display data including indications of an image to be displayed by a display device; grouping a plurality of pixels into two or more groups of pixels, each of the plurality of pixels corresponding to an addressable point on the display device; and assigning one or more display interface lanes of a plurality of display interface lanes to each of the two or more groups of pixels, the plurality of display interface lanes configured to communicate the display data to the display device.

The above example of at least one machine-readable storage medium, wherein the plurality of display interface lanes include a first display interface lane and a second display interface lane and wherein the two or more groups of pixels include a first group of pixels and a second group of pixels, the method further comprising assigning the first display interface lane to the first group of pixels and assigning the second display interface lane to the second group of pixels.

The above example of at least one machine-readable storage medium, wherein the display data includes indications of pixel colors for each of the plurality of pixels.

The above example of at least one machine-readable storage medium, further comprising transmitting the pixel colors for the pixels corresponding to the first group of pixels to the display device using the first display interface lane and transmitting the pixel colors for the pixels corresponding to the second group of pixels to the display device using the second display interface lane.

The above example of at least one machine-readable storage medium, wherein the plurality of display interface lanes include a first display interface lane, a second display interface lane, a third display interface lane, and a fourth display interface lane and wherein the two or more groups of pixels include a first group of pixels and a second group of pixels, the method further comprising assigning the first and second display interface lanes to the first group of pixels and assigning the third and fourth display interface lanes to the second group of pixels.

The above example of at least one machine-readable storage medium, wherein the display device includes a first timing controller and driver (TCON-DR) set operative on a first subset of the plurality of pixels and a second TCON-DR set operative on a second subset of the plurality of pixels, the two or more groups of pixels including a first group of pixels and a second group of pixels, the method further comprising associating the first subset of pixels with the first group of pixels and associating the second subset of pixels with the second group of pixels, the first subset of pixels including different pixels than the second subset of pixels.

The above example of at least one machine-readable storage medium, wherein the first and second TCON-DR sets are Chip-on-Glass components on the display device.

The above example of at least one machine-readable storage medium, wherein the display device is a first display device, each of the plurality of pixels corresponding to an addressable point on either the first display device or a second display device.

The above example of at least one machine-readable storage medium, wherein the display device is an LCD, an LED, an OLED, or a plasma display.

The above example of at least one machine-readable storage medium, wherein the display interface is a display port interface, an HDMI interface, a DVI interface, or a Thunderbolt interface.

The invention claimed is:

1. A display source, comprising:
    circuitry to communicate pixel data with a display panel via a display port link, the display port link comprising a plurality of lanes, the display panel comprising a plurality of segments, each of the plurality of segments coupled to a respective driver of a plurality of drivers;
    a processor coupled to the circuitry; and
    memory coupled to the processor, the memory comprising instructions that when executed by the processor cause the processor to:
        divide the pixel data into at least a first group of pixel data and a second group of pixel data, the first group of pixel data comprising indications of pixels associated with a first segment of the plurality of segments and the second group of pixel data comprising indications of pixels associated with a second segment of the plurality of segments different than the first segment of the plurality of segments;
        assign the first group of pixel data to at least a first lane of the plurality of lanes of the display port link, the first lane to couple to a first driver of the plurality of drivers, the first driver associated with the first segment; and
        assign the second group of pixel data to at least a second lane of the plurality of lanes of the display port link, the second lane to couple to a second driver of the plurality of drivers, the second driver associated with the second segment.

2. The display source of claim 1, the memory to store instructions that when executed by the processor cause the processor to send at least one control signal to the circuitry to cause the circuitry to transmit a first pixel stream corresponding to the first group of pixel data via at least the first lane of the display port link and transmit a second pixel stream corresponding to the second group of pixel data via at least the second lane of the display port link.

3. The display source of claim 1, the memory to store instructions that when executed by the processor cause the processor to:
    assign the first group of pixel data to the first lane and a third lane of the plurality of lanes of the display port link, the first lane and the third lane to couple to the first driver; and assign the second group of pixel data to the second lane and a fourth lane of the plurality of lanes of the display port link, the second lane and the fourth lane to couple to the first driver.

4. The display source of claim 3, the memory to store instructions that when executed by the processor cause the processor to send at least one control signal to the circuitry to cause the circuitry to:

transmit a first pixel stream corresponding to the first group of pixel data via the first lane of the display port link and the third lane of the display port link; and transmit a second pixel stream corresponding to the second group of pixel data via the second lane of the display port link and the fourth lane of the display port link.

5. The display source of claim 1, the memory to store instructions that when executed by the processor cause the processor to:

receive indications of an image to be displayed on the display panel; and store, in the memory, the indications of the image to be displayed at the pixel data.

6. The display source of claim 1, comprising a graphics processor unit (GPU), the memory to store GPU instructions that when executed by the GPU cause the GPU to generate the pixel data.

7. The display source of claim 6, wherein the processor comprises the GPU.

8. At least one non-transitory computer-readable medium comprising instructions, which when executed by a processor of a display source, cause the processor to:

divide pixel data into at least a first group of pixel data and a second group of pixel data, the first group of pixel data comprising indications of pixels associated with a first segment of a display panel and the second group of pixel data comprising indications of pixels associated with a second segment of the display panel different than the first segment, the display panel comprising a first driver coupled to the first segment and a second driver coupled to the second segment, the display source arranged to be coupled to the display panel via a display port link, the display port link comprising a plurality of lanes;

assign the first group of pixel data to at least a first lane of the plurality of lanes of the display port link, the first lane to couple to the first driver; and assign the second group of pixel data to at least a second lane of the plurality of lanes of the display port link, the second lane to couple to the second driver.

9. The at least one non-transitory computer-readable medium of claim 8, the instructions, when executed by the processor, cause the processor to send at least one control signal to circuitry of the display source to cause the circuitry to transmit a first pixel stream corresponding to the first group of pixel data via at least the first lane of the display port link and transmit a second pixel stream corresponding to the second group of pixel data via at least the second lane of the display port link.

10. The at least one non-transitory computer-readable medium of claim 8, the instructions, when executed by the processor, cause the processor to:

assign the first group of pixel data to the first lane and a third lane of the plurality of lanes of the display port link, the first lane and the third lane to couple to the first driver; and assign the second group of pixel data to the second lane and a fourth lane of the plurality of lanes of the display port link, the second lane and the fourth lane to couple to the first driver.

11. The at least one non-transitory computer-readable medium of claim 10, the instructions, when executed by the processor, cause the processor to send at least one control signal to circuitry of the display source to cause the circuitry to:

transmit a first pixel stream corresponding to the first group of pixel data via the first lane of the display port link and the third lane of the display port link; and transmit a second pixel stream corresponding to the second group of pixel data via the second lane of the display port link and the fourth lane of the display port link.

12. The at least one non-transitory computer-readable medium of claim 8, the instructions, when executed by the processor, cause the processor to:

receive indications of an image to be displayed on the display panel; and store the indications of the image to be displayed at the pixel data.

13. The at least one non-transitory computer-readable medium of claim 8, comprising graphics processor unit (GPU) instructions, the GPU instructions when executed by a GPU of the display source cause the GPU to generate the pixel data.

14. The at least one non-transitory computer-readable medium of claim 13, wherein the processor comprises the GPU.

15. A system comprising:

a display panel comprising:
   a first segment,
   a first driver for the first segment,
   a second segment, and
   a second driver for the second segment;

a display port link comprising a plurality of lanes;

circuitry to communicate pixel data with the display panel via the display port link;

a processor coupled to the circuitry; and memory coupled to the processor, the memory comprising instructions that when executed by the processor cause the processor to:

divide the pixel data into at least a first group of pixel data and a second group of pixel data, the first group of pixel data comprising indications of pixels associated with the first segment and the second group of pixel data comprising indications of pixels associate with the second segment, assign the first group of pixel data to at least a first lane of the plurality of lanes of the display port link, the first lane to couple to the first driver, and assign the second group of pixel data to at least a second lane of the plurality of lanes of the display port link, the second lane to couple to the second driver.

16. The system of claim 15, the memory to store instructions that when executed by the processor cause the processor to send at least one control signal to the circuitry to cause the circuitry to transmit a first pixel stream corresponding to the first group of pixel data via at least the first lane of the display port link and transmit a second pixel stream corresponding to the second group of pixel data via at least the second lane of the display port link.

17. The system of claim 15, the memory to store instructions that when executed by the processor cause the processor to:
   assign the first group of pixel data to the first lane and a third lane of the plurality of lanes of the display port link, the first lane and the third lane to couple to the first driver; and
   assign the second group of pixel data to the second lane and a fourth lane of the plurality of lanes of the display port link, the second lane and the fourth lane to couple to the first driver.

18. The system of claim 17, the memory to store instructions that when executed by the processor cause the processor to send at least one control signal to the circuitry to cause the circuitry to:
   transmit a first pixel stream corresponding to the first group of pixel data via the first lane of the display port link and the third lane of the display port link; and
   transmit a second pixel stream corresponding to the second group of pixel data via the second lane of the display port link and the fourth lane of the display port link.

19. The system of claim 15, the memory to store instructions that when executed by the processor cause the processor to:
   receive indications of an image to be displayed on the display panel; and
   store, in the memory, the indications of the image to be displayed at the pixel data.

20. The system of claim 15, comprising a graphics processor unit (GPU), the memory to store GPU instructions that when executed by the GPU cause the GPU to generate the pixel data.

21. The system of claim 20, wherein the processor comprises the GPU.

22. A method comprising:
   dividing, by a processor at a display source, pixel data into at least a first group of pixel data and a second group of pixel data, the first group of pixel data comprising indications of pixels associated with a first segment of a display panel and the second group of pixel data comprising indications of pixels associated with a second segment of the display panel different than the first segment, the display panel comprising a first driver coupled to the first segment and a second driver coupled to the second segment, the display source arranged to be coupled to the display panel via a display port link, the display port link comprising a plurality of lanes;
   assigning the first group of pixel data to at least a first lane of the plurality of lanes of the display port link, the first lane to couple to the first driver; and
   assigning the second group of pixel data to at least a second lane of the plurality of lanes of the display port link, the second lane to couple to the second driver.

23. The method of claim 22, comprising sending, by the processor, at least one control signal to circuitry of the display source to cause the circuitry to transmit a first pixel stream corresponding to the first group of pixel data via at least the first lane of the display port link and transmit a second pixel stream corresponding to the second group of pixel data via at least the second lane of the display port link.

24. The method of claim 22, comprising:
   assigning the first group of pixel data to the first lane and a third lane of the plurality of lanes of the display port link, the first lane and the third lane to couple to the first driver; and
   assigning the second group of pixel data to the second lane and a fourth lane of the plurality of lanes of the display port link, the second lane and the fourth lane to couple to the first driver.

25. The method of claim 24, comprising sending at least one control signal to circuitry of the display source to cause the circuitry to transmit a first pixel stream corresponding to the first group of pixel data via the first lane of the display port link and the third lane of the display port link, and to transmit a second pixel stream corresponding to the second group of pixel data via the second lane of the display port link and the fourth lane of the display port link.

* * * * *